United States Patent [19]
Fleck et al.

[11] Patent Number: 6,041,387
[45] Date of Patent: Mar. 21, 2000

[54] APPARATUS FOR READ/WRITE-ACCESS TO REGISTERS HAVING REGISTER FILE ARCHITECTURE IN A CENTRAL PROCESSING UNIT

[75] Inventors: Rod G. Fleck, Mountain View; Roger D. Arnold, Sunnyvale, both of Calif.

[73] Assignee: Siemens Aktiengesellschaft, Munich, Germany

[21] Appl. No.: 08/928,428

[22] Filed: Sep. 12, 1997

[51] Int. Cl.[7] .................................................. G06F 12/00
[52] U.S. Cl. ........................ 711/5; 711/100; 711/154; 711/157
[58] Field of Search ...................... 395/800; 365/189.03; 711/100, 154, 200, 5, 157

[56] References Cited

U.S. PATENT DOCUMENTS 4,313,162  1/1982  Baun et al. ................................ 710/38

5,649,229  7/1997  Matsuzaki et al. ..................... 395/800

FOREIGN PATENT DOCUMENTS 0 473 805 A1  9/1990  European Pat. Off. .

*Primary Examiner*—Tuan V. Thai

[57] ABSTRACT

A data processing unit has a set of data registers and a set of address registers. Each register has a width of n bits. Furthermore, there are provided address load and store buffers associated with the address registers, data load and store buffers associated with the data registers and a bus having a plurality of bus lines being connected to the store buffers. A data memory unit is connected to the bus. The data registers are arranged in such a way that at least n data registers are connected in parallel to respective bus lines, n being greater than 1, and the address registers are arranged in such a way, that at least m address registers are coupled in parallel to respective bus lines, m being greater than 1. Thus, at least four registers can be accessed in parallel.

11 Claims, 7 Drawing Sheets

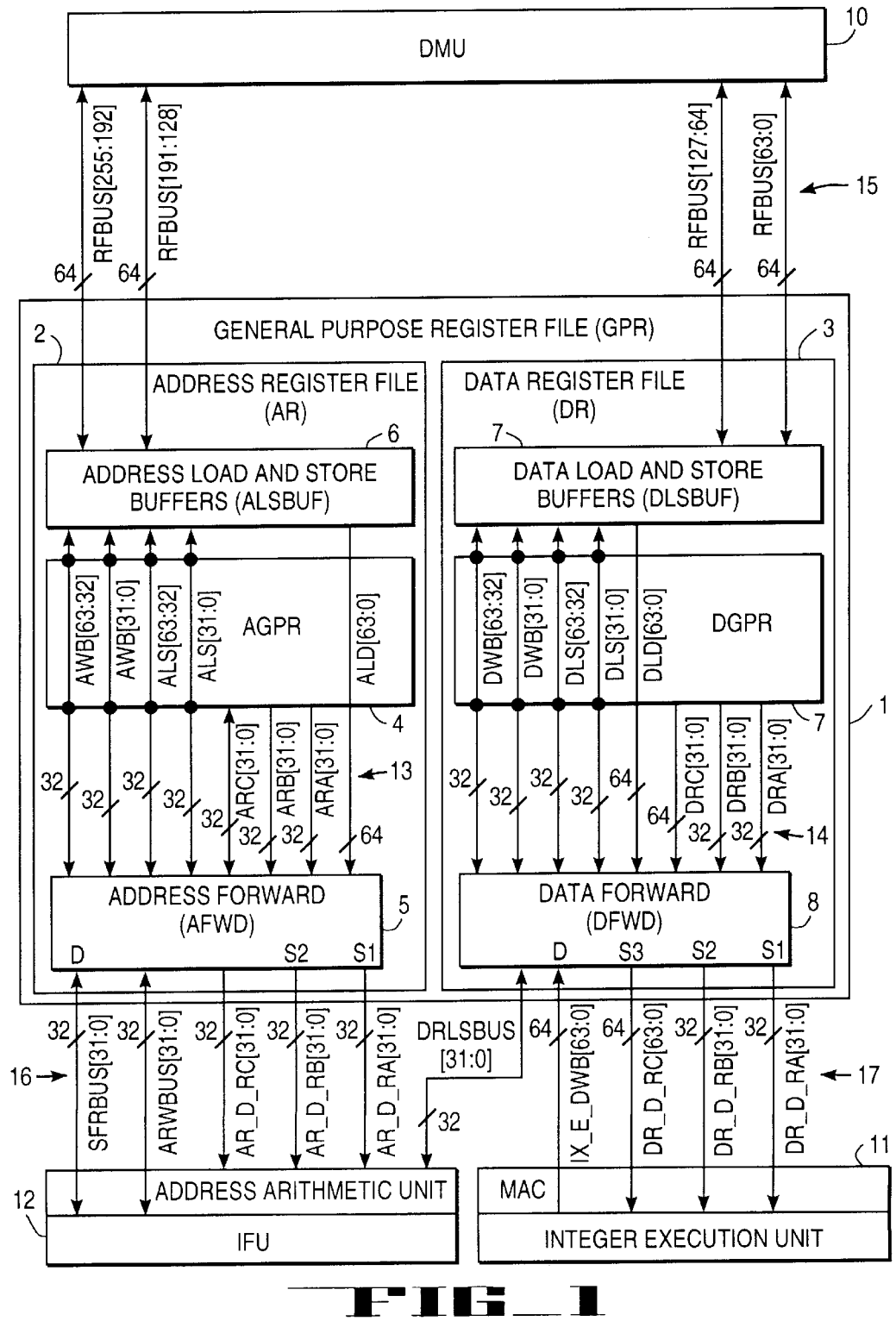
FIG_1

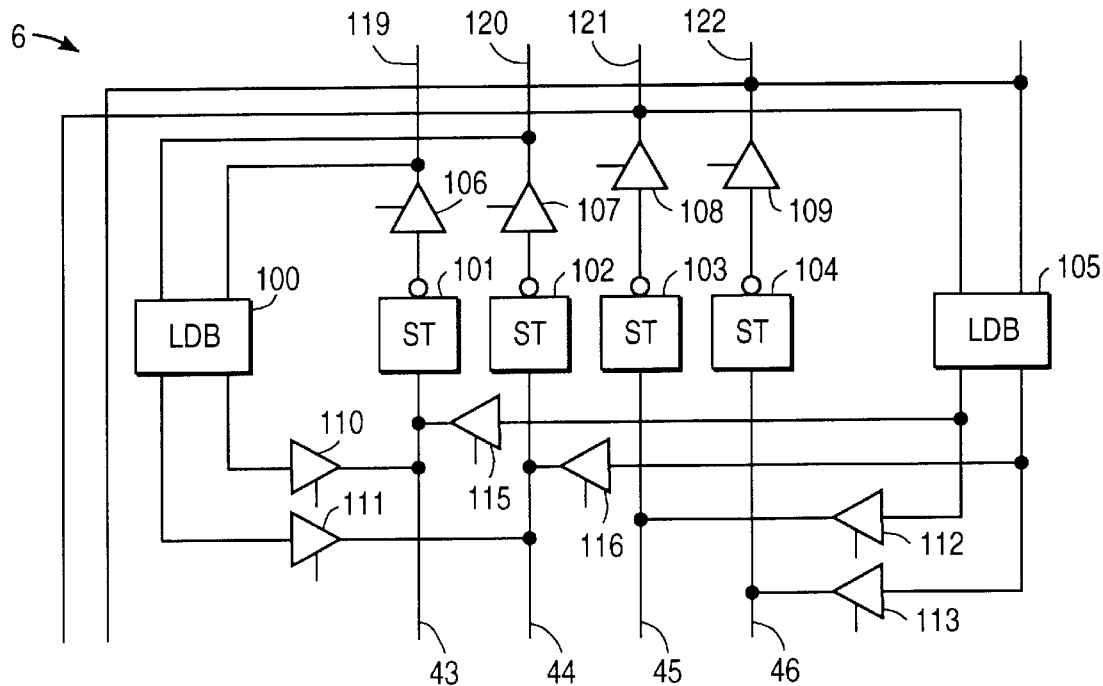
FIG_2A
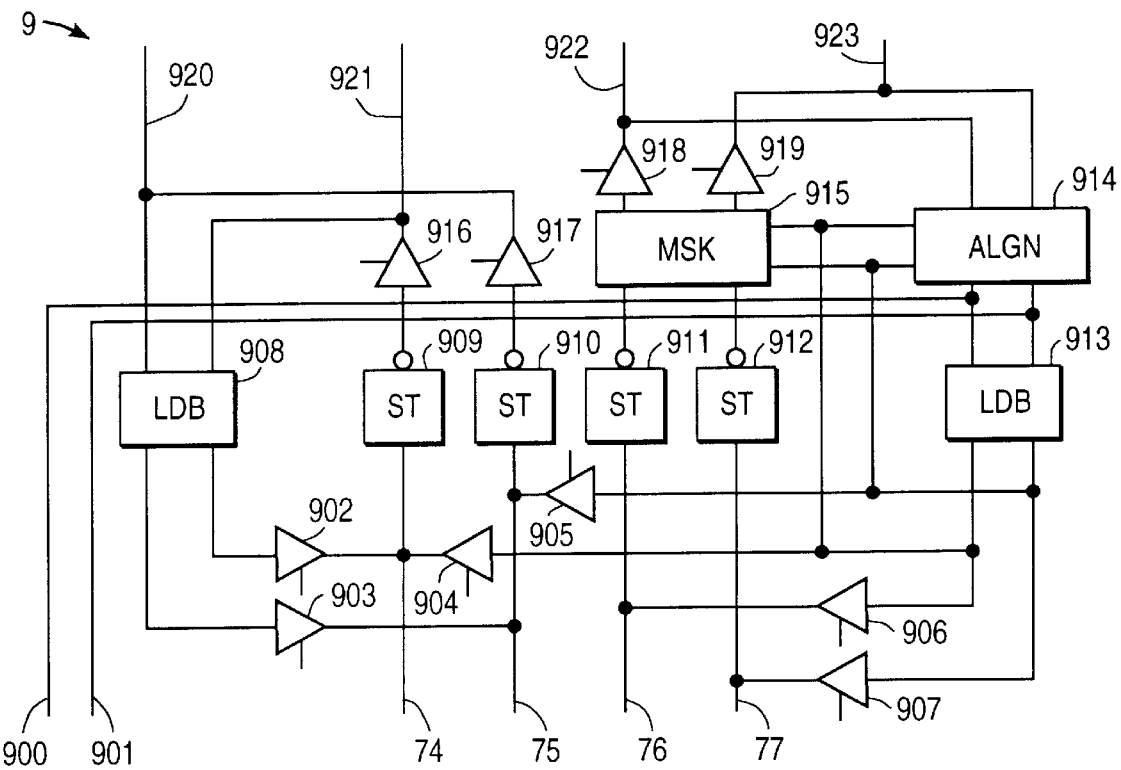
FIG_2B

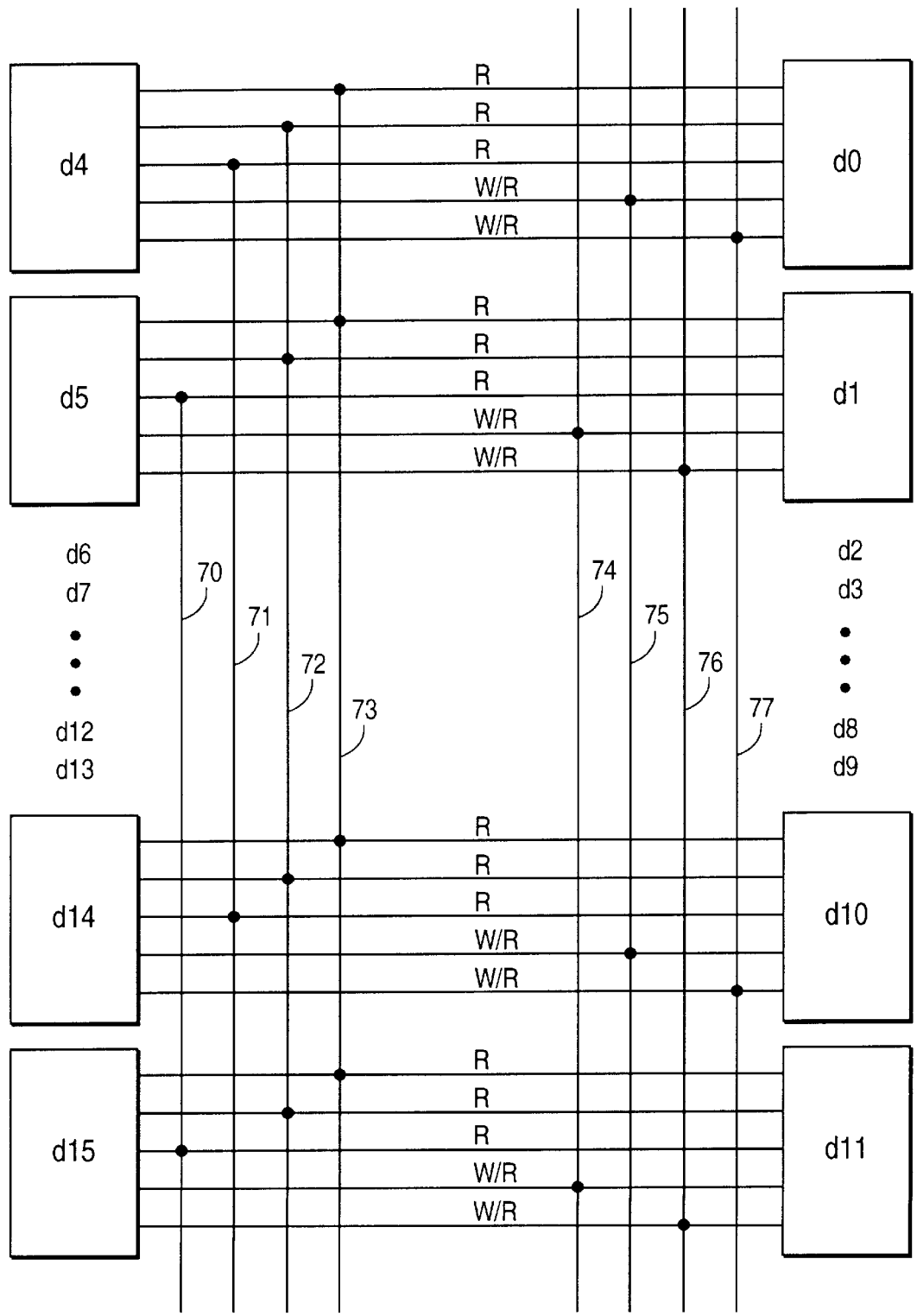
FIG_2C

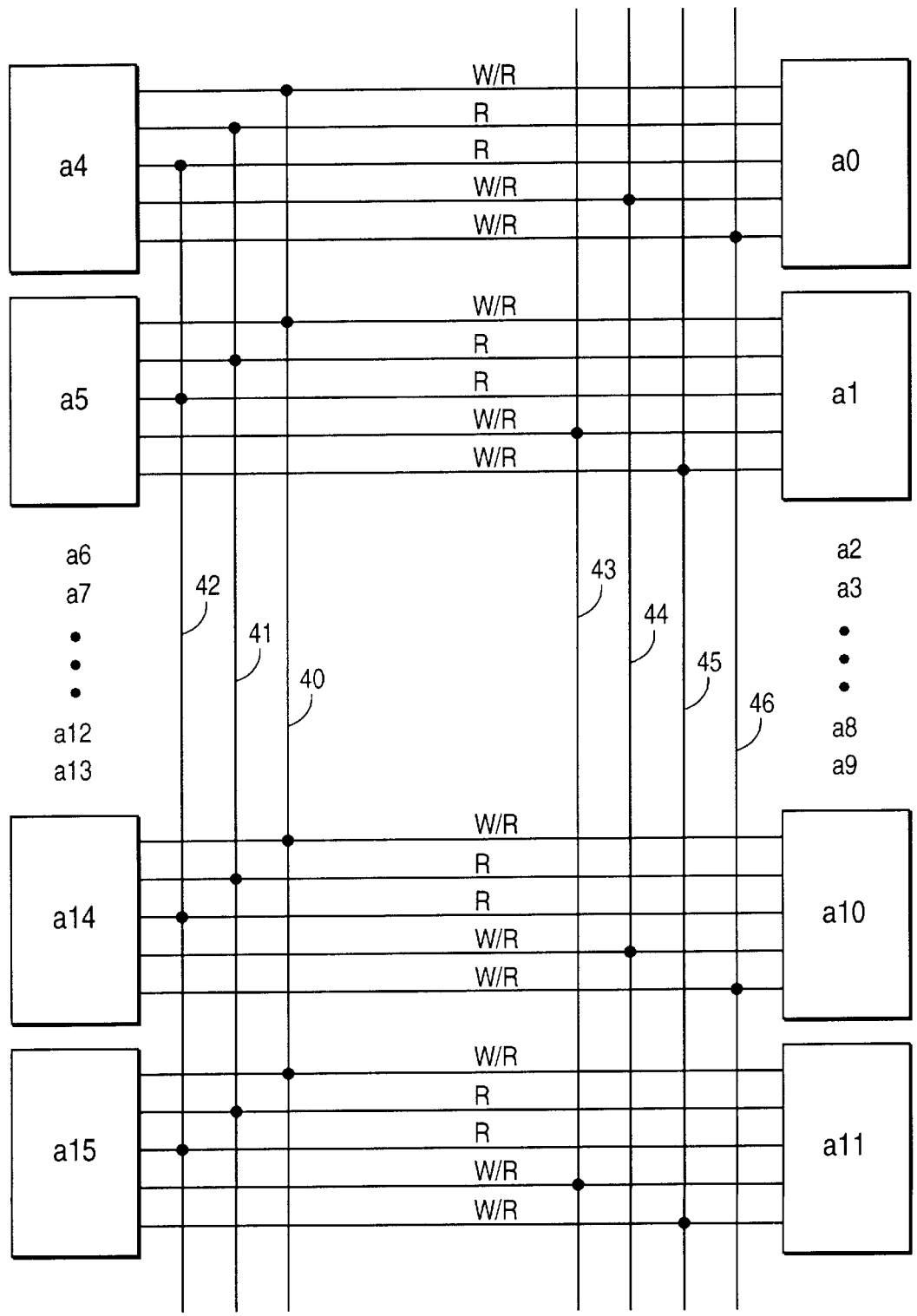
FIG_2D

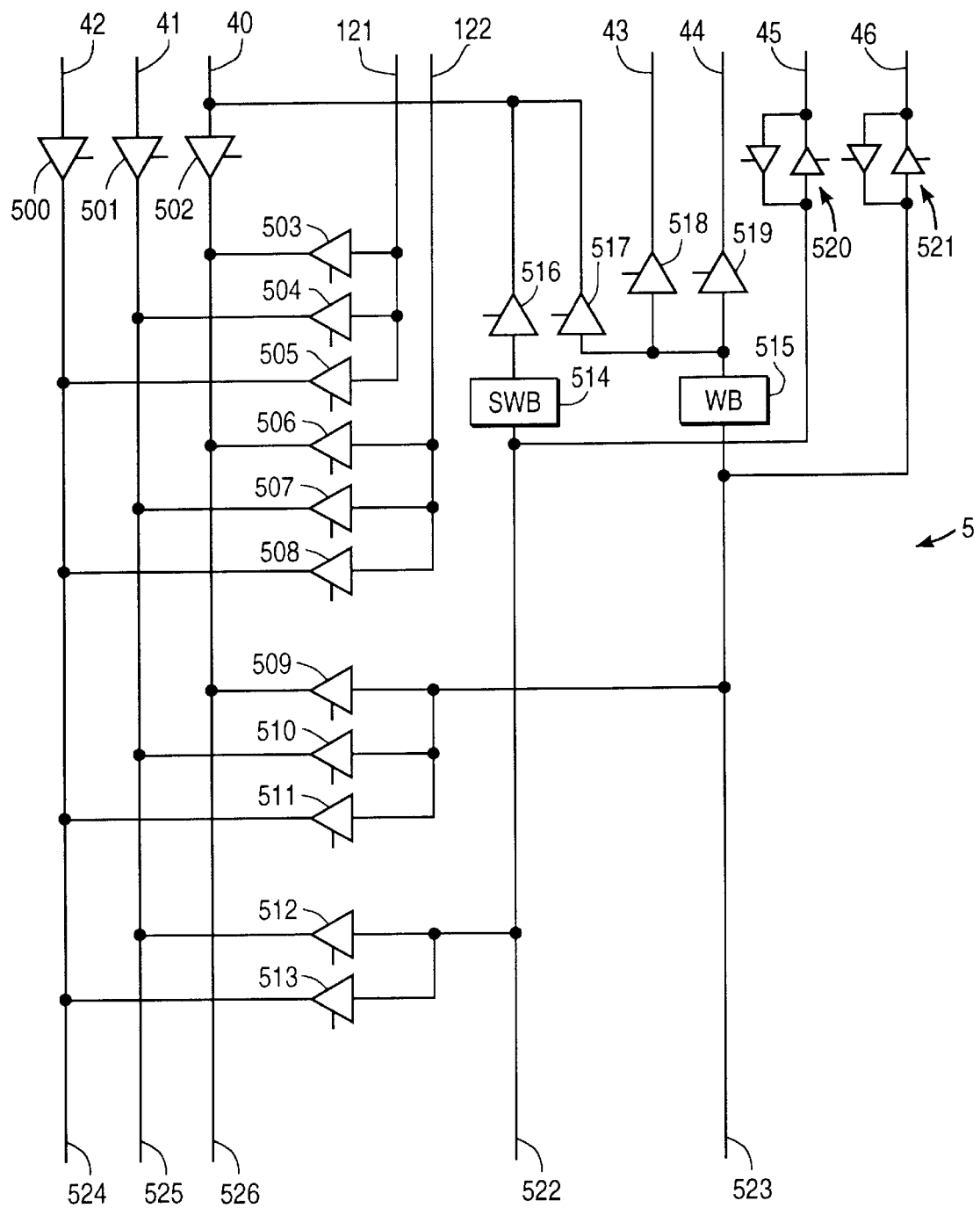
FIG_2E

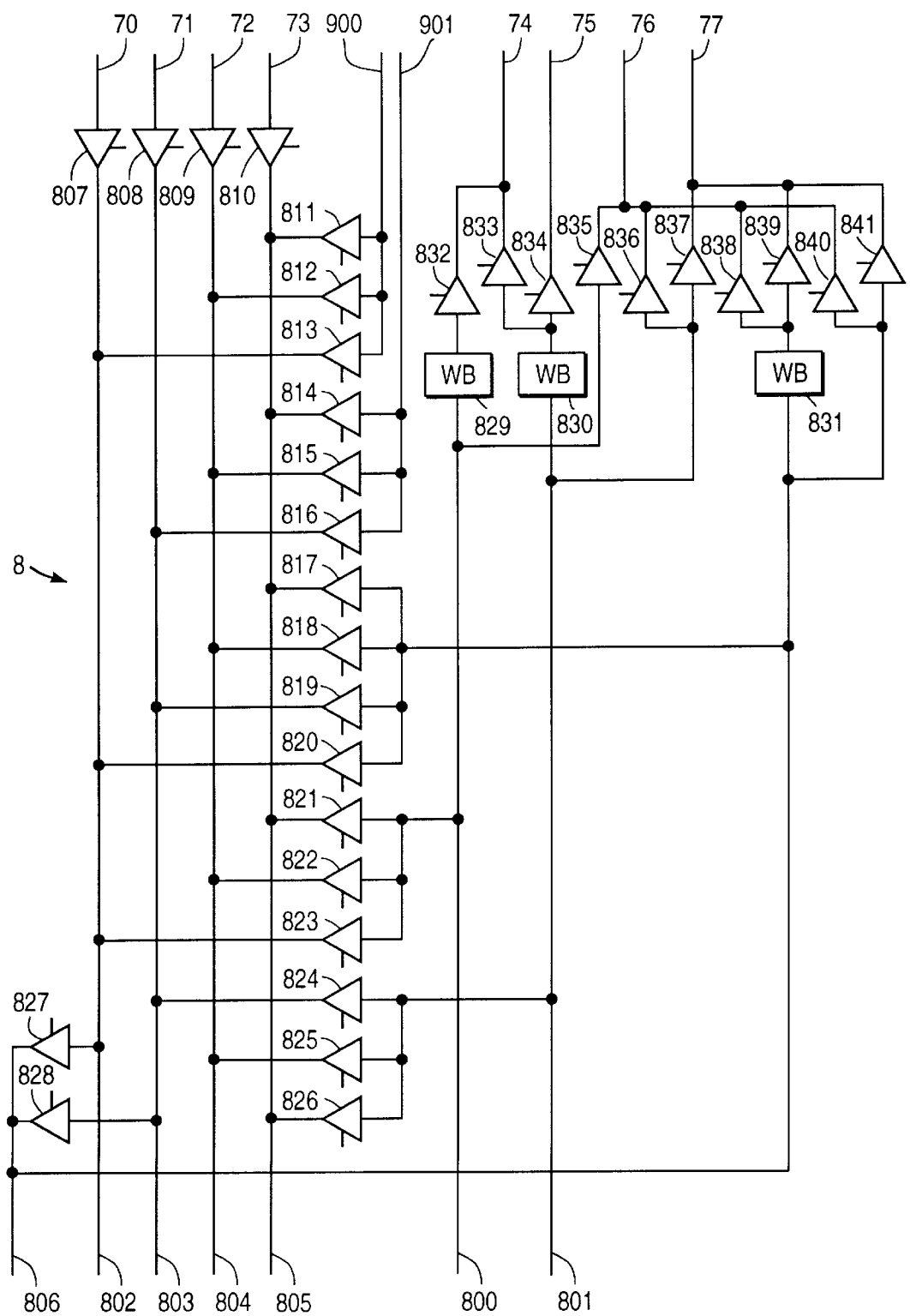
FIG_2F

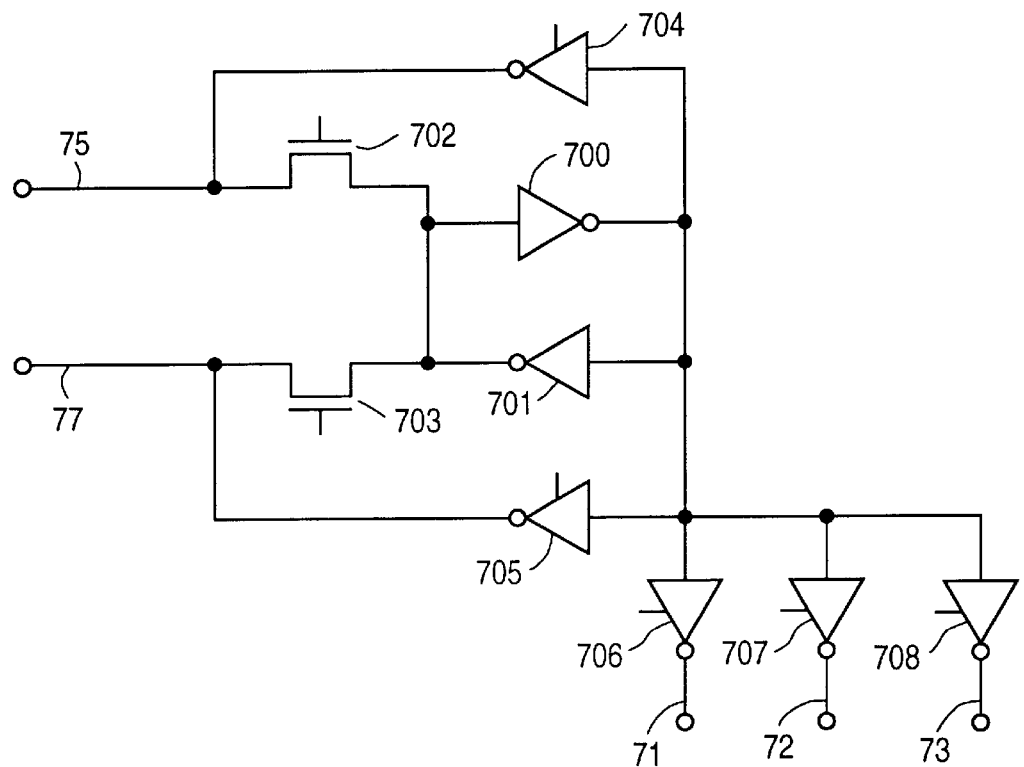
FIG_4
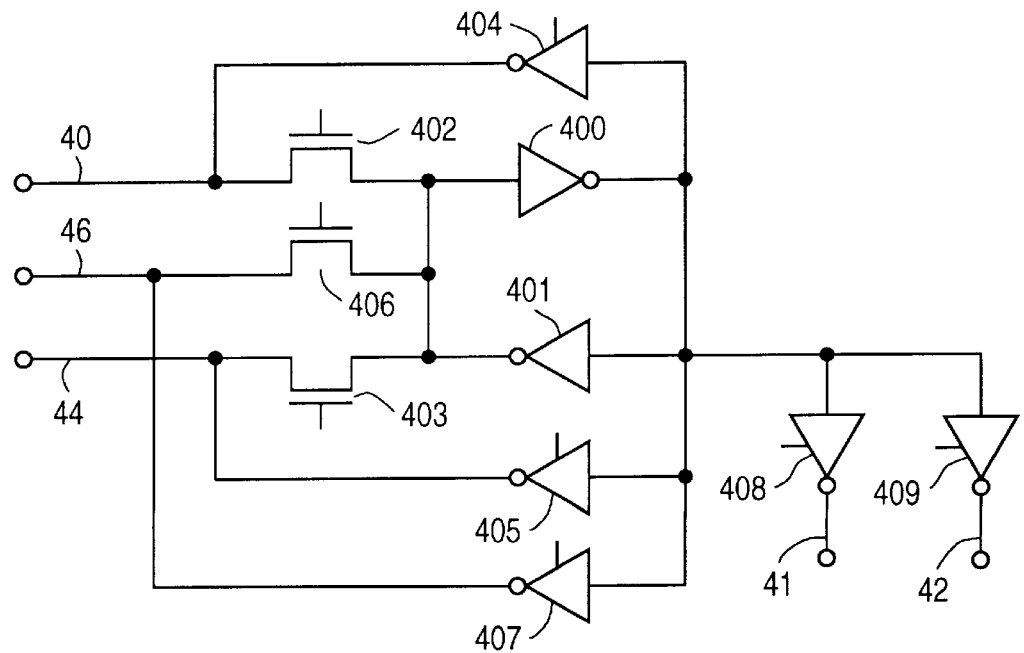
FIG_3

APPARATUS FOR READ/WRITE-ACCESS TO REGISTERS HAVING REGISTER FILE ARCHITECTURE IN A CENTRAL PROCESSING UNIT

BACKGROUND OF THE INVENTION

The present invention relates to a processing unit and, in particular, to a central processing unit (CPU) such as a microcontroller. Microcontrollers are well known in the art, and a large variety of such devices from low end devices (e.g., a 4/8-bit controller) to high end devices (e.g., a 32-bit controller) are available. High end controllers are used in almost any kind of electronic devices, such as laser printers and hard disks or for controlling any kind of processes, for example, in automobiles, etc.

With more complex tasks to be solved, the demand for very fast, high end controllers is rising. In particular, such devices are necessary to control real time applications. In such applications, it is necessary to react very fast to external events. If such an event occurs, the content of at least a specific set of registers needs to be switched. If this context switching is faster, the reaction time of the control system is better.

SUMMARY OF THE INVENTION

Therefore, it is an object of the present invention to provide a processing unit with the capability of very fast read/write access to address and data registers in a CPU.

This object is achieved by means of a data processing unit having a set of data registers and a set of address registers. Each register has a width of n bits. Furthermore, there are provided address load and store buffers associated with said address registers, data load and store buffers associated with said data registers and a bus having a plurality of bus lines being connected to said store buffers. A data memory unit is connected to said bus. The data registers are arranged in such a way that at least n data registers are connected in parallel to respective bus lines, n being greater than 1 and the address registers are arranged in such a way, that at least m address registers are coupled in parallel to respective bus lines, m being greater than 1. Thus, at least four registers can be accessed in parallel.

If, for example, 4 data registers and 4 address registers can be loaded or stored simultaneously, then a 32-bit microcontroller-bus has to be 256 bits wide. The advantage of such an arrangement is, that a context switch can be done very fast because 8 registers are stored and loaded in only 2 respective cycles. This allows a very fast reaction time to external events. Also, processing time is speed up because commands can be implemented that provide parallel processing. That is, more than one register can be loaded or stored at the same time.

To enable multi-register read and write procedures, each register is provided with multiple uni- and/or multiple bidirectional ports, which couple the registers with a memory unit and/or with an address arithmetic pipe or an integer pipe or any other processing unit. The registers can be divided into different sets of registers, for example, even and odd registers. Thus, an optimized layout of the respective registers is possible, while accessibility to the registers is maintained. Each of the above mentioned lines can be selected separately, and the lines are linked to odd or even memory addresses.

A wide variety of implementations is possible. Either all register cells communicate through one multiple-word-wide bus, whereby each register cell has a plurality of read/write lines which are connected to each word lines of the multiple-word-wide bus, or different set of registers connect to respective word lines of the multiple-word-wide bus which connects to the memory. Multiplexers and alignment units can couple any register with any address location within the memory.

Further, a unit is provided which handles zero and sign extension for byte and half-word load instructions. The address registers can be connected to an address arithmetic unit or any other processing unit through an address forward buffer, and the data registers can be coupled to a multiply accumulator unit (MAC) and/or Integer execution unit or any other processing unit through a respective data forward buffer.

BRIEF DESCRIPTION OF THE DRAWINGS

FIG. 1 shows a functional block diagram of a register file according to the present invention, FIG. 2A shows a data load and store buffer unit, FIG. 2B shows an address load and store buffer unit, FIG. 2C shows a data register file unit, FIG. 2D shows an address register file unit, FIG. 2E shows a data forward unit, FIG. 2F shows an address forward unit, FIG. 3 shows a address register cell in more detail, and FIG. 4 shows a data register cell in more detail.

DESCRIPTION OF THE PREFERRED EMBODIMENT

FIG. 1 shows an overview of the general purpose register file of an 32 bit microcontroller according to the present invention. Only one plane showing one single bit of each register is shown in this drawing. The general purpose register file 1 comprises an address register file 2 and a data register file 3 that contain a plurality of address and data registers 4, 7 with a predetermined bit width and buffers 5, 6, 8, 9. In the preferred embodiment the register bit width is 32 bits, and the number of registers is 16. This bit width can be any bit size according to the specification of the respective microcontroller, microprocessor or data handling unit.

On the one hand, the address registers 4 are connected via a bus 13 to an address forward unit 5 and on the other hand to address load and store buffer 6. Further, the data register file 1 contains a plurality of data registers 7, for example, 16 data registers with a bit width of 32 bit. A second bus 14 is provided which connects the data registers 7 on the one hand to data load and store buffers 9 and on the other hand to data forward unit 8. The general purpose register file 1 is on the one hand connected to a data memory unit 10 through a third bus 15 and on the other hand to additional buses 16, 17. Bus 16 connects the address forward buffers 5 and parts of the data forward buffers 8 to an unit 12 comprising, for example, an address arithmetic unit and an instruction fetch unit (IFU). Bus 17 connects the data forward buffers 8 to an unit 11 comprising, for example, a multiply accumulator (MAC) and an integer execution unit.

FIGS. 2A through 2F show the elements of the general purpose register file 1 in more detail. Only one bit of each register d0 ... d15, a0 ...a15 is shown in this diagram. The other 31 bits of the register d0 ... d15, a0 ... a15 are arranged in parallel. Throughout the FIGS. 2A to 2F the same numerals represent the same elements.

FIG. 2D shows registers in an address register file. For a better overview, registers a2 to a13 are not shown in FIG.

2D. Every address register a0, . . . a15 of the address register file 4 has two unidirectional outputs for reading and three bidirectional I/O-ports. One internal bus line 40 is connected to the first bidirectional I/O-port of all address registers a0, . . . a15, and two lines 41 and 42 are connected to the respective two outputs of all address registers a0, . . . a15. Further, two internal bus lines 44 and 46 are connected to respective I/O-ports of all even address registers a0, a2, a4 . . . a14. Two more lines 43 and 45 which are connected to the I/O-ports of all odd address registers a1, a3, a5 . . . a15.

FIG. 2A shows the address load and store buffer 6 of FIG. 1 in detail. Bus lines 43 to 46 connect to the respective inputs of store buffers 101 to 104. The outputs of store buffers 101 to 104 are connected to memory bus lines 119 to 122 through drivers 106 to 109. All drivers are tri-state drivers which are provided with a control input for selective activation by means of a control unit (not shown). Two blocks 100 and 105 indicate 4 load buffers which are connected on the one hand to the memory bus lines 119 to 122 and on the other hand through drivers 110 to 113 to the internal bus lines 43 to 46. In addition, the outputs of the load buffer 105 are connected through buffers 115 and 116 to the internal bus lines 43 and 44.

FIG. 2E shows the address forward unit 5 of FIG. 1 in detail. Bus lines 40, 41 and 42 are connected to address forward output bus lines 524, 525 and 526 through drivers 500, 501 and 502, respectively. Two memory bus lines 121 and 122 are each connected to the input of three drivers 503, 504, 505 and 506, 507, 508. The outputs of drivers 503 and 506 connect to bus line 526, the outputs of drivers 504 and 507 to bus line 525 and the outputs of drivers 505 and 508 to bus line 524. Internal bus lines 43 and 44 are connected to the outputs of two drivers 518 and 519, respectively. The inputs of drivers 518 and 519 are connected to the output of a write-back buffer 515 the input of which is connected to an address forward bus input line 523. Two other drivers 516 and 517 are provided the output of which are coupled with the internal bus line 40. The input of driver 517 is connected to the output of buffer 515. The input of driver 516 is connected to the output of buffer 514 the input of which is connected to address forward bus input line 522. Bus lines 45 and 46 are also connected to bus lines 522 and 523 through bidirectional drivers 520 and 521, respectively. The signal on bus line 523 is also fed to the inputs of three drivers 509, 510 and 511 the outputs of which are connected to bus lines 524, 525 and 526, respectively. The signal on bus line 522 is also fed to the inputs of two drivers 512 and 513 the outputs of which are connected to bus lines 524 and 525, respectively. Again, all drivers are tri-state drivers which are provided with a control input for selecting by means of a control unit (not shown). The three units 4, 5 and 6, according to FIG. 1, show the path of the address signals into and out of the address register file, whereby bus lines 119 to 122, according to FIG. 2A, connect to the memory unit 10 and bus lines 522 to 524 to the address arithmetic pipe and the instruction forward unit 12.

FIG. 2C shows data registers in a data register file. Again, for a better overview, registers d2 to d13 are not shown in FIG. 2C. Every data register d0, . . . d15 of the data register file 5 has three unidirectional outputs for reading and two bidirectional I/O-ports. Two lines 72 and 73 are connected to the first two outputs of all data registers d0, . . . d15, respectively. Further, an internal bus lines 71 is connected to respective outputs of all even data registers d0, d2, d4 . . . d14, whereas an internal bus line 70 is connected to respective outputs of all odd registers d1, d3, . . . d15. Two more lines 74 and 76 are connected to the I/O-ports of all odd address registers d1, d3, d5 . . . d15. Finally, two other lines 75 and 77 are connected to the I/O-ports of all even address registers d0, d2, d4 . . . d14.

FIG. 2B shows the data load and store buffer 9 of FIG. 1. Internal bus lines 74 to 77 are coupled to the inputs of four store buffers 909 to 912, respectively. The output of store buffer 909 is coupled to a memory bus line 921 through a driver 916, and the output of store buffer 910 is coupled to a memory bus line 920 through driver 917. The outputs of buffers 911 and 912 are connected to two input terminals of a mask unit 915. Mask unit 915 is provided with two input and two output terminals. The two output terminals of the mask unit 915 are coupled to two memory bus lines 922 and 923 through drivers 918 and 919, respectively. Two blocks 908 and 913 depict four load buffers. Block 913 is provided with two input terminals which are connected to two internal bus lines 900 and 901, respectively and to the memory bus lines 922 and 923 through an align block 914. The align block 914 is provided with two inputs which are connected to the inputs of mask unit 915 and the outputs of the store buffer 913, respectively. Furthermore, one output of load buffer 913 is coupled to internal bus lines 74 and 76 through respective drivers 904 and 906. The other output of load buffer 913 is coupled to internal bus lines 75 and 77 through drivers 905 and 907. The second load buffer 908 is connected on its input side to memory bus lines 920 and 921, respectively and on its output side to internal bus lines 74 and 75 through drivers 902 and 903, respectively. Again, all drivers are tri-state drivers which are provided with a control input for selecting by means of a control unit (not shown).

FIG. 2F shows data forward unit 8 of FIG. 1 in detail. Internal bus lines 70 to 73 are coupled with the data forward bus lines 802 to 805 through drivers 807 to 810. An additional data forward bus line 806 is connected to output terminals of drivers 827 and 828 the input terminals of which are connected to bus lines 802 and 803, respectively. Bus line 806 is part of the bus 16, according to FIG. 1, which is connected to the address arithmetic pipe and instruction forward unit 12. Bus line 900 is connected to the inputs of three drivers 811, 812 and 813 the outputs of which are connected to bus lines 805, 804 and 802, respectively. Bus line 901 is connected to the inputs of three drivers 814, 815 and 816 the outputs of which are connected to bus lines 805, 804 and 803, respectively. Two other data forward bus lines 800 and 801 are provided which are coupled to the input terminals of two write-back buffers 829 and 830, respectively. The output terminals of buffers 829 and 830 are coupled to bus lines 74 and 75 through drivers 832 and 834, respectively. In addition, the output of buffer 830 is coupled to bus line 74 through a driver 833. Bus line 800 is coupled to bus line 76 through driver 835, and bus line 801 is also coupled to bus lines 76 and 77 through drivers 836 and 837, respectively. Also, bus line 806 is coupled to bus lines 76 and 77 through drivers 840 and 841, respectively. Furthermore, bus line 806 is connected to the input terminal of a further write-back buffer 831 the output of which is coupled to bus lines 76 and 77 through drivers 838 and 839, respectively. Also, bus line 806 is coupled to bus lines 802 to 805 through drivers 817 to 820, respectively. Finally, bus line 800 is coupled to bus lines 805, 804 and 802 through drivers 821 to 823, respectively and bus line 801 is coupled to bus lines 803 to 805 through drivers 824 to 826, respectively. Again, all drivers are tri-state drivers which are provided with a control input for selecting by means of a control unit (not shown). The memory bus lines 119 to 122, according to FIG. 2A, and 920 to 923, according to FIG. 2B, form the memory bus 15 of FIG. 1. The bus lines 522 to 526, according to FIG. 2E, and 806 form bus 16 and bus lines 800 to 805 form bus 17 of FIG. 1.

FIG. 3 shows an embodiment of an address register cell. FIG. 3 shows numerals which are related to address register a0 according to FIG. 2D. Preferably all registers a0 . . . A15 have the same structure. The register core is formed by two inverters 400 and 401. These inverters 400 and 401 build a static memory cell, so that the output of each inverter is connected to the input of the other inverter. Input of inverter 400 and output of inverter 401 are coupled to bus lines 40, 44 and 46 through the load path of field effect transistors 402, 403 and 406. Each of field effect transistors 402, 403 and 406 forms a transfer-gate. The output of inverter 400 and the input of inverter 401 is connected to the inputs of five controllable tri-state drivers 404, 405, 407, 408 and 409. The output of driver 404 is connected to bus line 40, the output of driver 405 to bus line 44 and the output of driver 407 to bus line 46. The output of driver 408 connects to bus line 41 and the output of driver 409 to bus line 42.

FIG. 4 shows an embodiment of a data register cell. Again, FIG. 4 shows numerals which are related to data register d0 according to FIG. 2C. Preferably, all registers d0 . . . d15 have the same structure. The register core is formed by two inverters 700 and 701. These inverters 700 and 701 build a static memory cell, so that the output of each inverter is connected to the input of the other inverter. Input of inverter 700 and output of inverter 701 are coupled to bus lines 75 and 77 through the load path of field effect transistors 702 and 703. The output of inverter 700 and the input of inverter 701 are connected to the inputs of five controllable tri-state drivers 704, 705, 706, 707 and 708. The output of driver 704 is connected to bus line 75 and the output of driver 705 to bus line 77. The output of driver 706 connects to bus line 71, the output of driver 707 to bus line 72 and the output of driver 708 to bus line 73.

All other registers a1 . . . a15 and d1 . . . d15 are coupled to the respective bus lines as shown in FIGS. 2C and 2D. The transfer-gates 402, 403, 406, 702 and 703 (see FIGS. 3 and 4) and the tri-state drivers 404, 407, 408, 409, 704, 705, 706, 707 and 708 are controllable through respective select input terminals. The control circuit (not shown) generates the respective control signals to control the operation of these elements along with the other controllable drivers in the general purpose register file 1 (see FIG. 1). Only one of the transfer-gates of a register can be activated at a time for write operations whereas a plurality of tri-state drivers can be active in parallel for any read operation.

The general purpose registers handle all data which are processed by a data handling unit, such as a microcontroller/microcomputer. Therefore, they are part of the microprocessor/microcontroller core, and the way they handle the data has an important influence on the resulting speed of such a data handling unit. The general purpose register file 1 (see FIG. 1) supplies most frequently used operands to the integer and load and store pipelines in the units 11, 12. The load and store instructions in the instruction set architecture provide access to the data memory 10 where a majority of operands reside before being brought into the register file 1. As shown in FIG. 1, the functional block diagram for the register file is divided into address register file 2 and data register file 3. The data flow through the register files depends on the respective instruction which is being processed by the data handling unit.

According to the invention, data and address register block 4 and 7 are arranged in two separate blocks. Data registers in block 7 are arranged in a first matrix having c1 columns and r1 rows and address registers in block 4 are arranged in a second matrix having c2 columns and r2 rows. In the preferred embodiment, both matrixes are equal whereby 2 columns and 8 rows are provided. Nevertheless, in this embodiment, 4 data registers in block 4 and 4 address registers in block 7 are arranged in parallel, so that 8 registers, 4 even and 4 odd registers, can be accessed through bidirectional ports on the memory interface side at the same time. Therefore, in this example, the bus 15, which interfaces on the one hand with the data memory unit and on the other hand with the below described data processing units, needs a width of 256 bits.

On the processing unit side, the address register file 4 interfaces with any processing unit via bus 16. Bus 16, in this embodiment provides 6 bus lines, whereby 5 bus lines 522, . . . , 526 (see FIG. 2E) connect to the address register file. The data register file 7 interfaces with any processing unit via bus 17. Bus 17, in this embodiment, provides 6 bus lines. Every register cell, in this embodiment, according to FIGS. 3 and 4, has 5 ports whereby two bidirectional ports are assigned to either even or odd registers. Therefore, in this embodiment, 7 data registers and 5 address registers can be accessed at the same time and provide data to any processing unit whereby some registers can only be accessed through the read port.

Depending on the operating system running the microcontroller, this arrangement results in access to a plurality of general purpose registers of the core in one single cycle. According to the invention, m and n are integer numbers greater than 1 such that a minimum of 4 registers are accessible at the same time. Splitting the assignment of some ports into even and odd register sets can double this number. A context switch in a real time operating system may need 8 data registers and 8 address registers to be switched. In the preferred embodiment, this could be done in only 2 cycles, because 8 registers are accessible at the same time. If only 4 registers need to be changed for a context switch, this may be accomplished in a single cycle.

According to the invention, each register is provided with a plurality of unidirectional and a plurality of bidirectional ports. This allows more registers to be accessed at the same time and also a wide variety of different instructions to be executed in a minimum of time. This occurs in parallel as described below. These unidirectional and bidirectional ports can be coupled one to one to the bus which is connected to the data memory. This allows access to as many registers as ports are provided at the same time, or the registers are split into even and odd register sets which are coupled to even and odd bus lines. In the embodiment according to FIGS. 2A and 2B, the memory bus lines 119 and 121 as well as the memory bus lines 920 and 922 are coupled to odd registers in the address and data register file. Bus lines 120 and 122 as well as 921 and 923 are coupled to even registers, respectively. Therefore, only two ports of each register are used to interface with 4 registers of each register file 4 and 7 at the same time. On the data processing side, the internal bus can comprise additional bus lines which connect to unidirectional and bidirectional ports of the registers. In this embodiment, these bus lines are 802 . . . 806 and 524 . . . 526 (see FIGS. 2F and 2E). Splitting between even and odd registers is optional for these bus lines. Even more registers can be accessed at the same time on the processing unit side, as described above.

The bidirectional 256-bit bus interface on the data memory side of register file 1 supports the transfer of operands between data memory 10 and register file 1. This bus 15 could also be 128 bit wide or use 128-bits of 256-bit bus per cycle depending on the above described structure of the registers. The design of this bus can depend on power and noise related problems. Essentially, this bus has to support parallel access to at least 4 registers.

The design according to the invention allows byte, half word, word and double-word transfers in a single cycle. The context save or restore operation allows for the transfer of 16 words in two cycles as mentioned above (four cycles on a 128-bit bus). However, the register file 1 is capable of saving or restoring the entire context (32 words) in 4 cycles (or eight cycles on 128-bit bus). In general, the register file 1 supports word, double-word and quadruple-double word accesses. The data steering for byte, half-word and unaligned accesses is handled in the address load and store buffers 6, the data load and store buffers 9 and/or in the DMU module 10.

The general purpose register file 1 of this embodiment contains thirty two 32-bit registers which, according to the principle of the present invention, are equally split to facilitate parallel operation of integer, and load and store instructions as described above. The data portion of registers, which supply data operands to the integer pipeline, reside in the data register file block 7 (DGPR). The DGPR 7 contains sixteen 32-bit data registers. The address portion of registers which supply address operands to the load and store pipeline reside in the address register file block 4 (AGPR). The AGPR 4 contains sixteen 32-bit address registers. The instruction normally provides the register addresses for read and write accesses. The read and write address pointers are derived from the instruction in the instruction fetch stage and staged into the decode stage. The address in the read pointers is decoded to read the register operands in the decode stage. The address in write pointers is staged to the write-back stage. The decision for operand forwarding is made in the decode stage to minimize critical paths in the instruction fetch stage.

Context instructions, with implied address sequence, access a group of registers at a time in each register file 2, 3. For example, during context transfer, address registers a0, a1, a4, and a5 are accessed together during the first cycle, and address registers a2, a3, a6 and a7 are accessed together during the next cycle.

In this embodiment, the MAC instruction dictates the number of read and write ports in the data register file 7 which interface with the integer pipeline in unit 11. Also, the context access dictates the requirement of number of bidirectional I/O-Ports in the data register file 7 which interface with the DMU 10. The structure of a single register has been explained in accordance with FIGS. 3 and 4. Due to the need for execution of integer and load and store instructions in parallel, ports are dedicated in the data register file 7 to interface exclusively with the integer pipeline of unit 11 and DMU 10. The read and write ports in DGPR 7 allow parallel operation of multiply- and load-instructions or of multiply- and store-instructions. The multiply-instruction in this embodiment, for example, requires four 32-bit read ports represented by bus lines 802 to 805 (see FIG. 2F) and two 32-bit write ports represented by bus lines 800 and 801. The context access needs four 32-bit bidirectional ports represented by bus lines 920 to 923 (see FIG. 2B) and internal buses 900 and 901 which are separate from the read ports dedicated for integer pipeline in unit 11. The load- and store-instructions could share two out of four context ports and internal buses 74 to 77 (see FIG. 2B) which could be referred to as load and store ports and buses. The remaining two internal context buses could be shared by the integer pipeline for write-back operation which could be referred to as write-back buses.

Many address arithmetic instructions require two 32-bit read ports and one 32-bit write port in the address register file 4 to interface with the address arithmetic pipeline in unit 12. In this embodiment, the context access dictates the number of bidirectional I/O-ports in the address register file 4 which interface with the DMU 10. In the preferred embodiment, the context access needs four 32-bit bidirectional ports represented by bus lines 119 to 122 (see FIG. 2A) and internal buses which are separate from the read ports dedicated to the address arithmetic pipeline. In other words, one read/write port for each register which can be accessed in parallel must be provided. The number of ports therefore depends on the wide of the bus, or on the number of words which can be transferred in parallel on this bus. The load- and store-instructions could share two out of four context ports and two out of four internal buses which could be referred to as load and store ports and buses. The remaining two internal context buses could be shared by the address arithmetic pipeline for write-back operation which could be referred to as write-back buses. A dedicated 32-bit bidirectional port represented by bus lines 800 (see FIG. 2F) handles transfers between the instruction fetch unit and the special function registers of unit 12 and address register file 4. Context and stack pointers share the write back bus to interface with general purpose file 1.

Due to the limitation on the number of read and write ports available in the register file 1, instructions involving both data and address registers share existing ports only. As a result, in this embodiment, many address arithmetic operations when issued in parallel with integer instructions may need to be canceled in the current cycle and are-injected in the following cycle. A dedicated 32-bit bidirectional port 806 (see FIG. 2F) in the register file solves the data transfer problem between data and address register files. The data operand from a read port in the data register file 7 is steered to a read port in the address register file 4 through the bidirectional port. The result from the address arithmetic pipeline is steered to the load and store buses in the data register file 7 through the write port in the address register file 4 and the bidirectional port for write-back operation.

A read-modify-write operation is performed to access the link word from the data memory during context save or restore operation. The context save operation uses a pointer to access the link word. During context save operation, (a) the link word is loaded into the pointer register, (b) the contents from the pointer register are stored into a link word address location (as pointed to by the old pointer contents), and (c) the pointer register assumes the old pointer contents. The context restore operation uses the pointer register to access the link word. During context restore operation, (a) the link word is loaded into the pointer register, (b) the contents from the pointer register are stored into a link word address location (as pointed to by the old pointer register contents), and (c) the pointer register assumes the old pointer contents.

The register file 1 interfaces with the DMU 10 on one side, and on the other side directly connects to the address arithmetic pipeline IFU 12 and to MAC and integer pipelines 11. The controls for accessing the register file are derived from the instructions. To provide a better overview, these lines are not shown in FIGS. 2A to 2F. Address registers 4 are read in the first phase of the decode (or execute for store operand) cycle and written in the first phase of the write-back cycle to avoid having to forward a write-back result. For example, when the next+1 instruction needs the result from the current instruction (next being in the middle), the operand will be read directly from the address registers 4. Data registers 7 are read in the second phase of the decode (or execute for store operands) cycle and written in the second phase of the write-back cycle. Accessing address and data registers in alternate phases reduces peak power. The data register file 3 consists of the following blocks: data general purpose registers 7, load and store buffers 9 for data and, data forwarding buffers 8. The address register file 2 consists of the following blocks: address general purpose registers 4, load and store buffers 6 for address and, address forwarding unit 5.

In the preferred embodiment, the data register file block 3 contains 16 data registers d0, . . . d15. The basic data register cell in the data register file 7 has three read ports 71, 72, 73 (see FIG. 2F) and two bidirectional ports 75 and 77. Two read ports 72 and 73 connect to all sixteen registers d0, . . . d15 which enable access to any of these registers d0, . . . d15. However, the read ports 70, 71 are connected either to even or odd registers, so that even registers d0, d2, . . . d14 are accessed through even port 71 and odd registers d1, d3, d 15 are accessed through odd port 70. The MAC and other instructions need a third read operand. The MAC instruction requires a 64-bit accumulate operand which needs no further steering because it is already aligned to the even address boundary. However, if the third operand is a 32-bit data as in some special instructions, depending on the register address, the operand could show up on the even or odd read port 71, 70 which needs further steering in the integer pipeline. The operand steering for the special instruction could be handled in the integer pipeline in its own input multiplexers which avoids the need of sending the controls to the register file 1. This eliminates one more read port in the data register file cell.

Each bidirectional port 75, 77, 74, 76 in the register cell is connected either to even or odd registers, so that even registers d0, d2, . . . d14 are accessed through even port 75, 77 and odd registers d1, d3, . . . d15 are accessed through odd port 74, 76. This eliminates extra bidirectional ports in the data register cell. However, the data result needs to be aligned or steered to appropriate buses from outside either in data memory unit 10 for load and store instructions or in data forward unit 8 for integer instructions.

When integer, load and store instructions are issued in sequence, the data load and store buses 76 and 77 and the data write back buses 74 and 75 inside the data register file 3 are occupied respectively by integer and store instructions. The load data and destination register pointer stay in the load buffers until any of the buses 74 to 77 is made available. Meanwhile, the load buffers supply the data whenever the read pointer and destination pointer in the load buffers match.

For an integer followed by a load instruction sequence, the load data occupies the data load and store bus lines 76, 77 while the write back result of integer instruction occupies the data write back bus lines 74, 75. However, for load followed by store instruction sequence, the load data instead of using data load and store bus lines 76, 77, occupies the data write back bus lines 74, 75 while the store data occupies the data load and store bus lines 76, 77.

The address register file block 2 contains 16 address registers. The basic register cell in the register has two read ports 41, 42 (see FIG. 2E) and three bidirectional ports 40, 43, 44 or 40, 45, 46. However, both read ports 41, 42 and one bidirectional port 40 connect to all sixteen registers a0, . . . a15. Address arithmetic instructions need only two read ports and one write port because they share the write-back buses. The load and store instructions use the load and store ports. The third bidirectional port is dedicated to loop- and jump- instructions. As usual, the address result needs to be aligned or steered outside either in data memory unit 10 for load and store instructions or in the address forward unit 5 for address arithmetic instructions to be able to access even and odd bidirectional ports.

Data forward unit 8 forwards the load or integer results in the execute stage of the current instruction to the read ports in the decode stage of next instruction to minimize data dependent latency. Address forward unit 5 forwards the load or address arithmetic results in the execute stage of current instruction to the read ports in the decode stage of next instruction to minimize address dependent latency. The register contents are still read in the decode stage for next instruction even if the current instruction holds most recent data. The contents from the register are discarded if the current instruction has a most recent data result. If forward detection can be made for next instruction in the instruction fetch stage, register reading could be avoided for those operands whose address or data needs to be obtained from the results of current instruction in the execute stage hence saving power in the register file 1.

The integer followed by a load and store or an address arithmetic instruction could be issued in parallel. However, in this embodiment, if the result of the integer instruction needs to be forwarded to the address arithmetic pipeline, the instruction in the address arithmetic pipeline stalls for one cycle. The result forwarding from the address arithmetic pipeline to the integer pipeline does not need to stall the integer pipeline because the address arithmetic, load or store followed by integer instructions are never issued in parallel. A 32-bit bidirectional bus provides data transfers between data forwarding unit 8 and address forwarding unit 5. A special forwarding path allows execution of an integer followed by store instructions in parallel. The result from the integer pipeline in the execute stage is directly forwarded to the store buffers.

The write back operation for integer instructions goes through write-back buffers 829, 830, 831 (see FIG. 2F) in data forwarding unit 8. The write back operation for address arithmetic, loop- and some jump- instructions go through write-back buffer 515 (see FIG. 2E) in address forwarding unit 5.

The load and store buffer blocks 6 and 9 are functionally identical, except for the mask block 915 (see FIG. 2B) in data load and store buffer 9. Data load and store buffer 9 and address load and store buffer 6 interface with the DMU 10 for context, load and store operations. The data load and store buffer 9 provides an interface between data register file 7 and the DMU 10. The address load and store buffer 6 provides an interface between address register file 2 and the DMU 10. Even though the data path diagram of FIGS. 2A to 2F shows the configuration for bit 0, the same configuration applies to all bits in the diagram.

Simple load and context load instructions use the load buffers 100, 105 (see FIG. 2A), 908 and 913 (LDB) for write back operation. These load buffers 100, 105, 908 and 913 are separate from the write-back buffers in both data forward unit 5 and address forward unit 8. Context load instruction uses all four load buffers 100,105, 908 and 913 for staging two double words during context write back operation. The different load instructions for double words use two load buffers for staging a double word during write back operation. The other load instructions and similar instructions use an even or odd load buffer of buffers 100, 105, 908 and 913 for staging a word for write back operation.

The ALIGN sub-block 914 in data load and store buffer 9 handles zero and sign extension for byte and half-word load instructions. However, DMU 10 handles unpacking load data and data steering for unaligned, byte, half-word, word and double-word load operations in the load and store switch.

Simple store and context store instructions use the store buffers (STB) 101 . . . 104; 909 . . . 912 for store operation. Context store instruction uses all four store buffers 101 . . . 104; 909 . . . 912 for staging two double words during context store operation. The double word store instructions use two store buffers for staging a double word during store operation. The other store instructions and similar instructions use even or odd store buffer 102, 104, 910, 912; 101, 103, 909, 911 for staging a word for store operation. However, DMU 10 handles packing store data and data steering for unaligned, byte, half-word, word and double-word store operations in the load and store switch.

The swap instruction for words requires register that contents be swapped with data memory contents which could be viewed as a single cycle read-modify-write operation. The load and store buffers 6 and 9 handle the swap operation. The swap instruction for words performs a load instruction for words and a store instruction for words in parallel. The load data from data memory gets into the load buffers 908 and 913 and store data from register file gets into the store buffers 909 . . . 912 in execute stage. The store data goes out to the data memory 10 and the load data gets into the data register file 7 in the write back stage. The peripheral interface (not shown) and internal memory treat swap instructions as two separate operations.

For a special load and mask instruction a single cycle read-modify-write operation is required, and this instruction performs operations similar to the above mentioned swap instruction with a few minor changes. The load and mask instruction uses mask unit 915 to perform a mask operation. The load operation reads the data memory and updates the load buffers 908 and 913 but does not update registers d0 . . . d15. The store operation reads a double word from the registers d0 . . . d15 and stores only a single word into the data memory 10. The data from data memory 10 gets into the load buffers 908 and 913 and store data from register file 7 gets into the store buffers in the execute stage. The mask unit 915 uses upper word from the store buffers 911 and 912 to merge the lower word with the output from the load buffers 908 and 913. The store data goes out to the data memory 10 in the write back stage. Between the data memory unit 10 and the general purpose register file, a cache memory can be optionally provided to improve access to the data stored in the memory.

We claim:

1. A data processing unit comprising:
a set of data registers and a set of address registers, each register having a width of n bits, and each set of data and address registers comprising even and odd data and address registers, respectively,
first address load and store buffers associated with said even address registers and second address load and store buffers associated with said odd address registers,
first data load and store buffers associated with said even data registers and second data load and store buffers associated with said odd data registers,
a bus having a plurality of bus lines comprising a width of 4n bits being connected to said first and second store buffers,
a data memory unit being connected to said bus, wherein 2n-bit data words and 2n-bit address words can be transferred from or to said memory to or from one of said even, one of said odd data registers, one of said even, and one of said odd address registers in parallel;
wherein each register has a plurality of ports and at least one of said bus lines is coupled in parallel to selected registers of said set of data registers;
wherein each register comprises a memory cell having an input terminal and an output terminal, a plurality of tri-state buffers with inputs and outputs, said output terminal being connected to the inputs of said plurality of tri-state buffers;
wherein each register further comprises a plurality of transfer gates, said input terminal of said memory cell being connected to the outputs of said plurality of transfer gate.

2. Data processing unit as in claim 1, further comprising an address forward unit associated with said address registers and a processing unit connected to said address forward unit.

3. Data processing unit as in claim 2, wherein each address register has a plurality of ports, the address forward unit has a plurality of terminals, at least one of said terminals is coupled to one of said ports of selected registers of said set of address registers.

4. Data processing unit as in claim 3, wherein each register comprises a memory cell having an input terminal and an output terminal, a plurality of tri-state buffers with inputs and outputs, said output terminal being connected to the inputs of said plurality of tri-state buffers.

5. Data processing unit as in claim 4, wherein each register further comprises a plurality of transfer gates, said input terminal of said memory cell being connected to the outputs of said plurality of transfer gates.

6. Data processing unit as in claim 1, further comprising a data forward buffer associated with said data registers and a processing unit connected to said data forward buffer.

7. Data processing unit as in claim 6, wherein each data register has a plurality of ports, the data forward unit has a plurality of terminals, at least one of said terminals is coupled to one of said ports of at least one of said data registers.

8. Data processing unit as in claim 7, wherein each register comprises a memory cell having an input terminal and an output terminal, a plurality of tri-state buffers with inputs and outputs, said output terminal being connected to the inputs of said plurality of tri-state buffers.

9. Data processing unit as in claim 8, wherein each register further comprises a plurality of transfer gates, said input terminal of said memory cell being connected to the outputs of said plurality of transfer gates.

10. Data processing unit as in claim 1, wherein an align unit is provided which connects even or odd registers to even or odd addresses of the memory through said bus.

11. Data processing unit as in claim 1, wherein a mask unit is provided which is connected to at least one port of at least one of said registers.

* * * * *